(12) United States Patent
Cappello et al.

(10) Patent No.: US 12,236,524 B2
(45) Date of Patent: Feb. 25, 2025

(54) METHODS AND APPARATUS FOR THE CREATION AND EVALUATION OF VIRTUAL REALITY INTERACTIONS

(71) Applicant: Sony Interactive Entertainment Inc., Tokyo (JP)

(72) Inventors: Fabio Cappello, London (GB); Mandana Jenabzadeh, London (GB); Michael Lee Jones, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 142 days.

(21) Appl. No.: 17/968,300

(22) Filed: Oct. 18, 2022

(65) Prior Publication Data
US 2023/0133049 A1 May 4, 2023

(30) Foreign Application Priority Data
Nov. 3, 2021 (GB) ...................................... 2115791

(51) Int. Cl.
*G06T 17/00* (2006.01)
*G06F 3/16* (2006.01)
(Continued)

(52) U.S. Cl.
CPC ................ *G06T 17/00* (2013.01); *G06F 3/16* (2013.01); *G06T 7/62* (2017.01); *G06T 13/20* (2013.01); *G06T 19/20* (2013.01); *G06V 10/764* (2022.01)

(58) Field of Classification Search
CPC ..................................................... G06T 17/00
See application file for complete search history.

(56) References Cited

U.S. PATENT DOCUMENTS

2014/0306891 A1\* 10/2014 Latta .................... G02B 27/017
345/158
2018/0046245 A1\* 2/2018 Schwarz ............ G02B 27/0093
(Continued)

FOREIGN PATENT DOCUMENTS

EP 4177715 A1 5/2023

OTHER PUBLICATIONS

Extended European Search Report for corresponding EP Application No. 22201400.3, 8 pages dated Mar. 10, 2023.
(Continued)

*Primary Examiner* — Shivang I Patel
(74) *Attorney, Agent, or Firm* — Kilpatrick Townsend & Stockton LLP

(57) ABSTRACT

A data processing apparatus includes receiving circuitry to receive graphics data for at least a portion of a virtual environment, the graphics data including a plurality of virtual objects, a machine learning model trained to output data indicative of an object classification for one or more of the virtual objects in dependence upon the graphics data, assignment circuitry to assign one or more of the virtual objects to one or more virtual object groups in dependence upon the object classification for one or more of the virtual objects, where the virtual objects assigned to a same virtual object group have a same object classification, and control circuitry to share first interaction data associated with a first virtual object assigned to a virtual object group with a second virtual object assigned to the virtual object group to thereby permit use of the first interaction data for the second virtual object in response to a user interaction with the second virtual object in the virtual environment.

17 Claims, 3 Drawing Sheets

(51) Int. Cl.
  *G06T 7/62*      (2017.01)
  *G06T 13/20*     (2011.01)
  *G06T 19/20*     (2011.01)
  *G06V 10/764*    (2022.01)

(56) References Cited

U.S. PATENT DOCUMENTS

2018/0359040 A1    12/2018  Lee
2019/0139321 A1*    5/2019  Kocharlakota ......... G06F 3/011
2020/0346114 A1    11/2020  Verma
2021/0027531 A1     1/2021  Liu
2021/0089780 A1     3/2021  Chang
2021/0248826 A1     8/2021  Shriram

OTHER PUBLICATIONS

Combined Search and Examination Report for corresponding GB Application No. GB2115791.2, 9 pages dated Apr. 29, 2022.
Examination Report for corresponding GB Application No. 2115791.2, 4 pages dated Dec. 20, 2023.
Examination Report for corresponding GB Application No. 2115791.2, 5 pages dated May 16, 2024.

* cited by examiner

METHODS AND APPARATUS FOR THE CREATION AND EVALUATION OF VIRTUAL REALITY INTERACTIONS

FIELD OF THE DISCLOSURE

The present disclosure relates to virtual reality interactions.

DESCRIPTION OF THE PRIOR ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior against the present disclosure.

Images of virtual environments are typically generated for display to a user and features within the virtual environment can be created by developers which are responsive to a user input to thereby provide the user with sensory feedback for the virtual environment. A typical example of this is when a user provides an input to interact with virtual objects in a virtual environment, and data associated with the virtual objects is processed to provide a visual or audio update with respect to the virtual objects which is perceivable by the user. As such, visual and audio sensations can be provided to the user to provide sensory feedback to the user that the user has interacted with the virtual object thereby improving immersion.

During development of a virtual environment for a content such as a video game, content creation tools are typically used by a developer to create and evaluate interaction data specifying one or more interactions for different virtual objects in the virtual environment. Interactions can thus be triggered for objects for which a developer has created interaction data. With increasing size, complexity and realism of virtual environments (as well as increasing realism of interactions in virtual reality), creation and evaluation of virtual object interactions is becoming ever more time consuming for developers. In particular, in the case of a virtual object with which a user may have an expectation of interaction, a user's experience when attempting to interact with that object only to then realise that no interaction has been created for that object results in a severe loss of immersion for the virtual environment.

It is an aim to provide improved virtual reality interactions.

It is in the context of the above arrangements that the present disclosure arises.

Various aspects and features of the present disclosure are defined in the appended claims and within the text of the accompanying description. Example embodiments include at least a system, a method, a computer program and a machine-readable, non-transitory storage medium which stores such a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
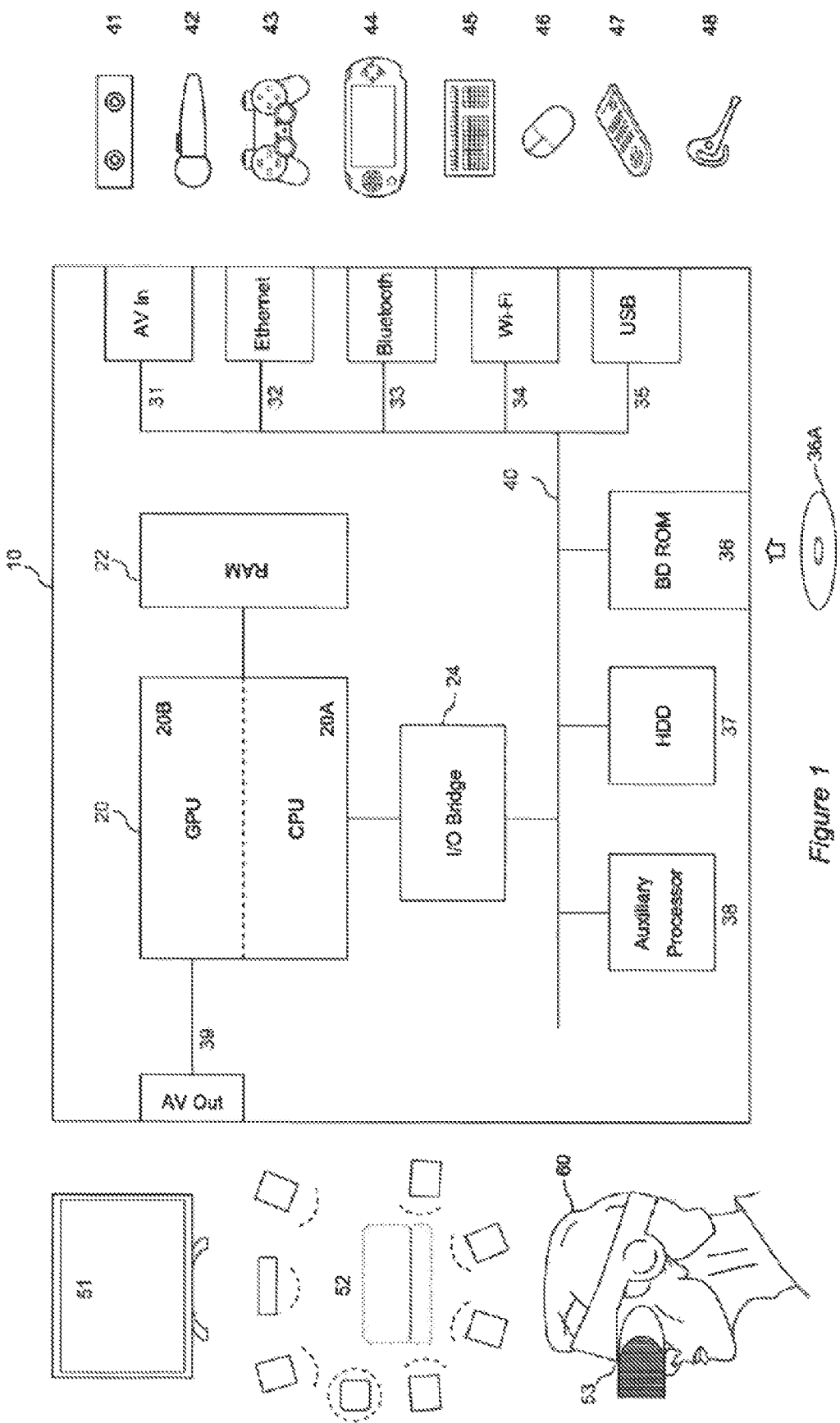
FIG. 1 is a schematic diagram illustrating a computer game processing apparatus.

FIG. 1 schematically illustrates the overall system architecture of a computer game processing apparatus such as the Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, processes data and generates video images (image data) and optionally audio for output via the AV output 39. Optionally, the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

FIG. 1 therefore provides an example of a data processing apparatus suitable for processing data associated with a virtual environment to generate images of the virtual environment for display to a user.

Figure 2:
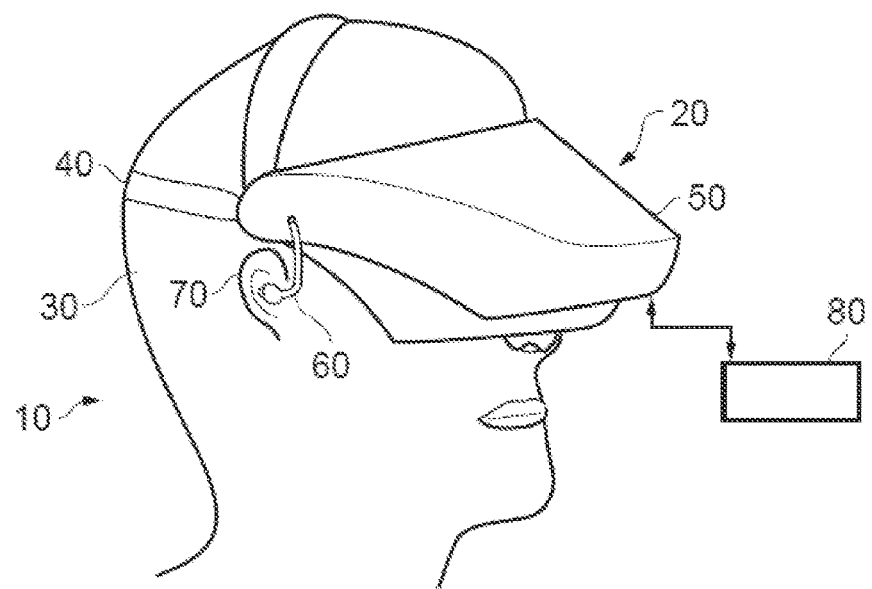
FIG. 2 schematically illustrates a head-mountable display apparatus (HMD) worn by a user.

Referring now to FIG. 2, an HMD 20 is shown as an example of an output device for displaying images of a virtual environment to a user 10. The user 10 is wearing the HMD 20 (as an example of a generic head-mountable apparatus—other examples including audio headphones or a head-mountable light source) on the user's head 30. The HMD comprises a frame 40, in this example formed of a rear strap and a top strap, and a display portion 50. Note that the HMD of FIG. 2 may comprise further features, but which are not shown in FIG. 2 for clarity of this initial explanation.

The HMD of FIG. 2 completely (or at least substantially completely) obscures the user's view of the surrounding environment. All that the user can see is the pair of images displayed within the HMD, as supplied by an external processing device such as the data processing apparatus of FIG. 1. In some cases, images may instead (or additionally) be generated by a processor or obtained from memory located at the HMD itself.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some cases the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A Bluetooth® antenna may provide communication facilities or may simply be arranged as a directional antenna to allow a detection of the direction of a nearby Bluetooth® transmitter.

In operation, a video signal is provided for display by the HMD. This could be provided by an external video signal source 80 such as a video games machine or data processing apparatus (such as a personal computer or the PS5®), in which case the signals could be transmitted to the HMD by a wired or a wireless connection. Examples of suitable wireless connections include Bluetooth® connections and an example of suitable wired connections include High Definition Multimedia Interface (HDMI®) and DisplayPort®. Audio signals for the earpieces 60 can be carried by the same connection. Similarly, any control signals passed between the HMD to the video (audio) signal source may be carried by the same connection. Furthermore, a power supply (including one or more batteries and/or being connectable to a mains power outlet) may be linked by a wired connection to the HMD. Note that the power supply and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may in some examples be carried by an optical fibre cable. In other examples, at least part of the functionality associated with generating image and/or audio signals for presentation to the user may be carried out by circuitry and/or processing forming part of the HMD itself.

Accordingly, the arrangement of FIG. 2 provides an example of a head-mountable display comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 2 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment.

The HMD is an example of an output device for displaying images of a virtual environment to the user 10. The HMD can optionally provide an audio output in dependence upon one or more audio signals. The HMD may optionally comprise one or more haptic interfaces for providing a haptic output to the user 10 wearing the HMD according to one or more haptic signals. For example, one or more haptic interfaces may be provided for providing a headset rumble. Alternatively or in addition, the user 10 may be provided with one or more haptic interactions via a peripheral device, such as a handheld controller. Hence more generally, images of a virtual environment can be displayed to the user 10 and the user can interact with the virtual environment visually, audibly and haptically.

During creation of content for a virtual environment, a developer will typically use one or more content creation tools to create one or more interactions for a given virtual object of the virtual environment. Interaction data specifying one or more interactions available for a virtual object can thus be created and associated with a virtual object (e.g. associated with the graphics data for a virtual object) for use in triggering one or more interactions for that virtual object in response to a user input. For example, the interaction data (e.g. one or more scripts) for an object may specify an audio event for the object and specify a condition (e.g. a specific user input or a condition within the virtual environment such as proximity of two virtual objects) for which that audio event is to be triggered. More generally, interaction data can be created for virtual objects to provide a range of interaction mechanisms such as visual interactions, audible interactions and/or haptic interactions. However, virtual environments often include a number of virtual objects for which no interaction data has been provided during development of the content, and such objects can result in a significant loss of immersion for a user when the user attempts to interact therewith. Some in-game virtual environments include a potentially large number of virtual objects for which no user interaction is available and a user's realisation of the user's inability to interact with certain virtual objects can cause an abrupt loss of immersion for the user.

The operations to be discussed below relate to techniques for improving virtual environments by allowing interaction data associated with a respective virtual object to be shared with other virtual objects in the virtual environment to permit use of the shared interaction data for providing interactions for other virtual objects.

Figure 3:
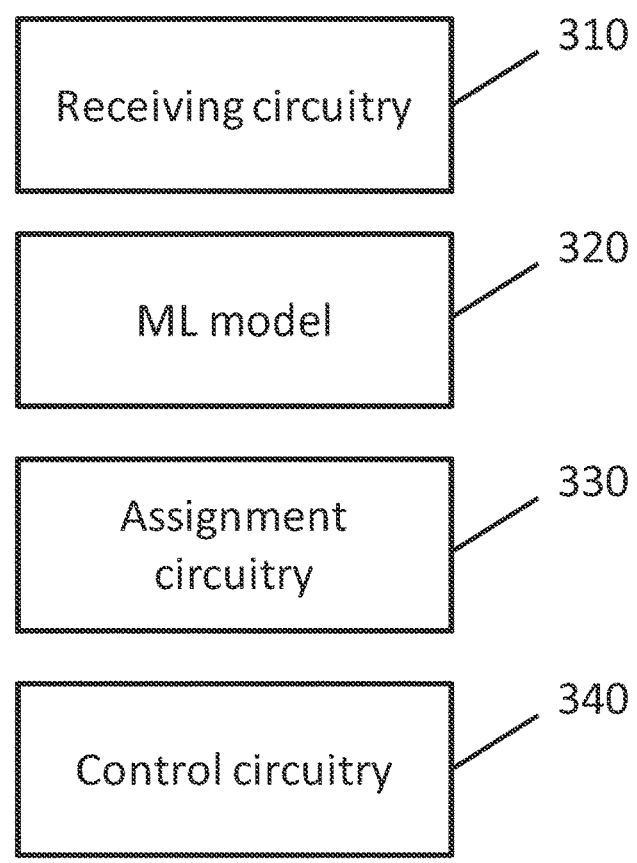
FIG. 3 is a schematic diagram illustrating a data processing apparatus.

FIG. 3 schematically illustrates a data processing apparatus 300 for sharing interaction data for a first virtual object with another virtual object to thereby permit use of the interaction data for the another virtual object and thus allow user interaction with the another virtual object. In embodiments of the disclosure, the data processing apparatus 300 comprises: receiving circuitry 310 to receive graphics data for at least a portion of a virtual environment, the graphics data including a plurality of virtual objects; a machine learning model 320 trained to output data indicative of an object classification for one or more of the virtual objects in dependence upon the graphics data; assignment circuitry 330 to assign one or more of the virtual objects to one or more virtual object groups in dependence upon the object classification for one or more of the virtual objects, wherein the virtual objects assigned to a same virtual object group have a same object classification; and control circuitry 340 to share first interaction data associated with a first virtual object assigned to a virtual object group with a second virtual object assigned to the virtual object group to permit use of the first interaction data for the second virtual object in response to a user interaction with the second virtual object in the virtual environment.

The receiving circuitry 310 is configured to receive graphics data for at least a portion of a virtual environment, in which the graphics data includes a plurality of virtual objects associated with the virtual environment. The graphics data for a virtual object defines one or more visual characteristics for the virtual object. For example, the graphics data may comprise mesh data, point cloud data and/or texture data for a respective virtual object. As such, the graphics data for a virtual object may be predefined graphics data (e.g. created by a developer using a virtual reality content creation tool) which is suitable for being processed by a processing unit (e.g. GPU 20B) to generate image data for one or more image frames. Alternatively or in addition, the graphics data may comprise one or more images of the virtual environment that have been generated for display by an output device (such as the HMD, such as that shown in FIG. 2, and/or a display device such as a TV or monitor). In some examples, the receiving circuitry 310 is configured to receive graphics data comprising image data generated by the apparatus in FIG. 1. Hence more generally, the graphics data comprises any suitable data that visually characterises a virtual object, and may comprise one or more from the list consisting of: mesh data; point cloud data; texture data; and image data. The data processing apparatus 300 may for example be provided as part of a device such as that shown in FIG. 1, or another processing device such as a cloud gaming server or the HMD 20. Hence in some examples, the receiving circuitry 310 may receive first mesh data associated with a first virtual object in a virtual environment and second mesh data associated with a second virtual object in the virtual environment. Alternatively or in addition, one or more images of the virtual environment generated for display by an output device (e.g. HMD 20) can be received, in which one or more of the images include a visual representation of the first and second virtual objects.

References herein to images received by the receiving circuitry 310 refer to either stereoscopic images for which left images and right images are generated for display to the respective eyes or a single image that is displayed to both eyes. The images of the virtual environment can be received and the images include a plurality of virtual objects having respective different positions within the virtual environment. For example, a first virtual object such as a virtual car may be included in a first image, and in another image another virtual object such as another virtual car (and/or another virtual object of a different type) may be present. Hence more generally, the received images include a plurality of virtual objects.

The machine learning model 320 is trained to receive at least some of the graphics data for the virtual environment received the receiving circuitry 310 and to output data indicative of an object classification for one or more of the virtual objects in dependence upon at least some of the graphics data. As such, the machine learning model 320 provides data indicative of a classification for at least some of the virtual objects represented in the graphics data. For example, the machine learning model 320 may output an integer which is mapped to a respective object classification for which the model has been trained, and the number of object classifications for which the machine learning model 320 is trained is not particularly limited. The machine learning techniques will be discussed in more detail later.

The assignment circuitry 330 is configured to assign one or more of the virtual objects in the graphics data (e.g. in one or more received images) to one or more virtual object groups in dependence upon the object classification for one or more of the virtual objects, wherein the virtual objects assigned to a same virtual object group each have a same object classification. Virtual objects having a same object classification (as predicted by the machine learning model 320) are assigned to a same group (virtual object group) by the assignment circuitry 330. By assigning a virtual object to a virtual object group, one or more instances of interaction data associated with the virtual object are shared and thus made available for use by one or more other virtual objects assigned to the same virtual object group. It will be appreciated that the number of respective virtual object groups is not particularly limited and may be dependent on the number of different object classifications predicted by the machine learning model 330, or in some cases a predetermined number of virtual object groups may be established in advance.

Hence more generally, the data processing apparatus 300 establishes one or more virtual object groups, in which the virtual objects assigned to a same virtual object group each have a same object classification. The interaction data available for a given virtual object assigned to the virtual object group can be shared with and thus made available for use by any other virtual object assigned to that same virtual object group. Hence, in some examples the interaction data for the respective virtual objects assigned to a same virtual object group can be made accessible for use by any of the virtual objects assigned to the virtual object group so that certain virtual objects for which a developer has not created interaction data can be made interactive, and/or certain virtual objects which are already interactive can be enhanced with further interactions from other virtual objects assigned to the same group. Techniques for controlled sharing of interaction data within a given virtual object group are discussed in more detail later.

In some examples, a virtual object group may be established in advance for a given object classification and a reference virtual object may be assigned in advance to the virtual object group, in which the reference virtual object has associated interaction data. In this way, the assignment circuitry 330 can assign one or more virtual objects to the same virtual object group as the reference virtual object, and interaction data associated with the reference virtual object can be shared with one or more of the virtual objects assigned to the virtual object group by the assignment circuitry 330. For example, a user may manually create a reference virtual object and assign the reference virtual object to the virtual object group to act as a reference for sharing interaction data within the virtual object group. Hence in some examples, the assignment circuitry 330 can be configured to assign one or more virtual objects to a virtual object group in dependence upon the object classification for one or more of the virtual objects, and the control circuitry 340 can share the interaction data associated with the reference virtual object with one or more of the other virtual objects assigned to the virtual object group.

In some examples, the assignment circuitry 330 may assign a plurality of virtual objects to a same virtual object group, in which interaction data has been associated with a single virtual object assigned to the virtual object group. In this case, the control circuitry 340 can share the interaction data associated with the individual virtual object with each remaining virtual object assigned to the virtual object group. For example, in the case of a video game, a virtual phone (or other type of virtual object) in one scene may have been created and associated with interaction data, whereas other scenes may include virtual phones for which interaction data has not been provided. The data processing apparatus 300 can assign virtual objects to virtual object groups as discussed above so that, for example, the interaction data for an individual virtual phone in one scene can be shared with other virtual phones assigned to the same group and thus use of the interaction data can be permitted for another virtual phone in response to a user interaction with that virtual phone in the virtual environment. Consequently, a number of virtual objects which are available for user interaction can be increased thus providing a more interactive and immersive virtual environment.

In some cases a virtual object group may be established, by the assignment circuitry 330, for each respective object classification indicated by the data output by the machine learning model 320 for the graphics data received for the virtual environment. For example, the machine learning model 320 may receive at least some of the images (and/or polygonal meshes) of the virtual environment and output data indicative of N respective object classifications (where N is an integer that is greater than or equal to 1). The assignment circuitry 330 can thus establish N respective virtual object groups so that a virtual object group is established for each of the object classifications (e.g. object types). Consequently, the assignment circuitry 330 can assign a virtual object represented in the images (and/or polygonal meshes) of the virtual environment to a respective virtual object group, and in the case of two or more virtual objects assigned to a same group, sharing of one or more instances of interaction data is permitted for the virtual objects assigned to that group. Hence more generally, the number of virtual object groups can be freely established based on the number of respective object classifications predicted by the machine learning model 320.

Alternatively or in addition, in some cases the assignment circuitry 330 can be configured to define, in advance, a predetermined number of virtual object groups each corresponding to a different predetermined object classification and the assignment circuitry 330 assigns a virtual object to a predetermined virtual object group according to whether the object classification for the virtual object matches a predetermined object classification for the virtual object group. Hence, rather than establishing, by the assignment circuitry 330, a virtual object group for each respective object classification indicated by the data output by the machine learning model 320, one or more predetermined virtual object groups each corresponding to a different predetermined object classification can be defined in advance. For example, the assignment circuitry 330 can be configured to define a first virtual object group corresponding to a first predetermined object classification and a second virtual object group corresponding to a second predetermined object classification, in which the predetermined object classifications are specified in advance (e.g. by a user). In this way, a virtual object group can be defined for a particular object classification. A user may select, in advance, one or more object classifications for which the assignment circuitry 330 is to establish a virtual object group. For example, a first virtual object group corresponding to a virtual car classification and a second virtual object group corresponding to a virtual phone classification may be defined by the assignment circuitry 330 so that any virtual object predicted by the machine learning model 320 to have a car classification or a phone classification can be assigned to the appropriate group. It will be appreciated that any suitable object classification can be specified in advance.

The number of respective virtual object groups is not particularly limited. In a simplest case there may be a single virtual object group corresponding to a respective object classification. This may be because the machine learning model 330 has been trained for a single object classification or because the assignment circuitry 330 is configured to define, in advance, a single predetermined virtual object group.

As mentioned previously, by assigning a virtual object to a virtual object group, one or more instances of interaction data associated with that virtual object are shared and thus made available for use by one or more other virtual objects assigned to that same virtual object group. The one or more instances of interaction data represent data that has been created for, and associated with, a virtual object during a development stage for use by a data processor, such as a game engine, for applying one or more interactions for that virtual object. The interaction data associated with a given virtual object may comprise one or more from the list consisting of: animation data; audio data; and haptic data.

In embodiments of the disclosure, the interaction data associated with a virtual object has been created in advance for the first virtual object. Various tools exist for use during content development to first create a virtual object for a virtual environment and associate interaction data for enabling interaction(s) therewith. The interaction data associated with a virtual object represents predefined data created in advance for a virtual object. Examples of such content creation tools include the Unity editor providing various tools for creating data for virtual objects (e.g. game objects) for scenes. In some examples, the interaction data associated with a virtual object may have been manually created by a developer specifically for that virtual object by manually specifying one or more properties for one or more interactions. In other examples, the interaction data associated with a virtual object may have been selected by a developer from a database comprising instances of predefined interaction data for different virtual objects. The data processing apparatus 300 may comprise a storage media to store (and allow retrieval by a game engine, or other processing unit, of) game data, in which the game data comprises one or more instances of interaction data associated with one or more virtual objects. Alternatively or in addition, such game data may be retrieved from a server.

The interaction data associated with a given virtual object thus defines one or more properties for one or more user interactions. During an on-going game session, for example, a data processing unit, such as a game engine, for performing processing functions for progressing a game can be configured to generate an interaction signal for a virtual object using one or more instances of interaction data associated with the virtual object. In particular, the data processing unit can generate at least one of an audio signal, haptic signal and animation signal in dependence upon the interaction data.

For example, a virtual object such as a virtual phone may have one or more associated instances of interaction data for input to a data processor, such as a game engine, to provide an update with respect to the virtual object in the virtual environment in response to a user input. In one example, the interaction data associated with the virtual phone may comprise audio data for use by a game engine to generate one or more audio signals for the virtual phone to thereby provide an audio output to the user. Alternatively or in addition, the interaction data associated with the virtual phone may comprise haptic data for use by the game engine to generate one or more haptic signals for the virtual phone to thereby provide a haptic interaction to the user via one or more haptic interfaces (e.g. a handheld controller such as the Sony PS5 DualSense®). Alternatively or in addition, the interaction data associated with the virtual phone may comprise animation data for use by the game engine to generate one or more visual animations to be applied to the virtual phone to animate the virtual phone.

Hence more generally, interaction data associated with the virtual object is processable by a processing unit (such as a game engine) to generate one or more interaction signals for the virtual object. The interaction data associated with a virtual object thus enables user interaction with that virtual object.

The assignment circuitry 330 assigns one or more of the virtual objects of the virtual environment to one or more of the virtual object groups, so that virtual objects assigned to a same virtual object group each have a same object classification, and the control circuitry 240 is configured to share first interaction data associated with a first virtual object assigned to a virtual object group with a second virtual object assigned to the virtual object group to permit use of the first interaction data for the second virtual object in response to a user interaction by the user with the second virtual object in the virtual environment. Therefore, interaction data that has been associated with a given virtual object by a developer can be made available for use (e.g. by a processing unit such as a game engine) for generating user interactions for other virtual objects in the virtual environment that have been assigned by the assignment circuitry 330 to a same virtual object group as the given virtual object. In this way, in the case of a virtual object for which there is no associated interaction data (and thus user interaction is otherwise not enabled), interaction with the virtual object is enabled on the basis of the interaction data shared for the virtual object group to which the virtual object has been assigned. Referring to the above example of a virtual telephone for which interaction is not possible, interaction data that has been associated with a first virtual telephone in the virtual environment can be shared within the virtual object group, and hence use of the interaction data can be permitted for use with another virtual telephone assigned to that virtual object group for which interaction data has not been associated.

For example, the data processing apparatus 300 can be configured to receive graphics data from a processing apparatus such as that shown in FIG. 1 so as to receive graphics data during an on-going game session and assign respective virtual objects to one or more virtual object groups accordingly so that interaction data can be shared. Alternatively, the data processing apparatus 300 can be configured to receive graphics data by accessing a virtual object database used by a content developer during a development stage of a video game (or other type of content) so as to obtain graphics data for at least some of the virtual objects in the virtual environment (or at least some of the virtual objects in a given scene for a video game) and assign at least some of the virtual objects to one or more virtual object groups to establish one or more such groups for allowing sharing of interaction data.

In some embodiments of the disclosure, the control circuitry 330 is configured to share the first interaction data associated with the first virtual object with each virtual object assigned to the virtual object group. The assignment circuitry 330 is configured to assign at least two virtual objects having a same object classification, as predicted by the machine learning model 320, to a same virtual object group and interaction data associated with a respective virtual object can be shared with any of the other virtual objects that have been assigned to the same group. As such, interaction data can be shared amongst the virtual objects assigned to a same virtual object group. The number of virtual objects assigned to a given virtual object group is not particularly limited.

For example, during a development stage of a video game, interaction data may have been created for and associated with a virtual bottle for a given scene for allowing user interaction(s) with the virtual bottle, such as grasping and drinking of a content of the virtual bottle by a virtual avatar with an associated audio sound. However, other portions of the virtual environment corresponding to other scenes may include other virtual bottles only for decorative purposes such that interaction data is not available for these other virtual bottles. The data processing apparatus 300 can thus assign a number of respective virtual objects each having an object classification corresponding to a bottle classification to a same virtual object group, and interaction data associated with one of the virtual bottles can be shared for use by any of the other virtual bottles for applying the interaction. Therefore, user interaction with a larger number of virtual objects is enabled.

In some embodiments of the disclosure, the assignment circuitry 330 assigns a plurality of virtual objects to a same virtual object group, in which one of the plurality of virtual objects assigned to the virtual object group has associated interaction data and each of the remaining virtual objects assigned to the virtual object group has no associated interaction data. In this case, the interaction data for the virtual object is shared within the group so as to permit use of that interaction data for interaction with any of the virtual objects assigned to the group. Consequently, each of the virtual objects can be made interactive for a user and is capable of providing substantially the same interaction(s) as that of the virtual object for which the interaction data was initially created.

It will be appreciated that in the above discussion, a single virtual object has associated interaction data and sharing of the interaction data with any of the other virtual objects assigned to the same group is beneficial for increasing the number of interactive virtual objects in the virtual environment.

In some cases a situation can arise in which two or more virtual objects have been assigned to a same virtual object group and two or more of the respective virtual objects have respective interaction data associated therewith.

In some embodiments of the disclosure, the assignment circuitry 330 is configured to assign a first virtual object and a second virtual object to a same virtual object group, and first interaction data is associated with the first virtual object and second interaction data is associated with the second virtual object. The first interaction data and the second interaction data may be complementary in that they provide different types of user interaction (e.g. one provides an audio interaction and the other provides a haptic interaction) or provide a same type of interaction but different events (e.g. a first audio event and a second audio event) such that both the first and second interaction data can be permitted for use by a respective virtual object. Alternatively, the first interaction data and the second interaction data may not be complementary. Techniques for controlled sharing of interaction data within a given virtual object group in the case of two or more virtual objects each having their own associated interaction data are now discussed.

In some embodiments of the disclosure, the control circuitry 340 is configured to share one of the first interaction data and the second interaction data with a third virtual object assigned to the virtual object group to permit use of one of the first interaction data and the second interaction data for the third virtual object in response to a user interaction with the third virtual object in the virtual environment. In a simplest case, in order to avoid potential conflicts arising from two or more respective instances of interaction data in a same group which may or may not be incompatible, the control circuitry 340 can be configured to permit use of one of the first and second interaction data (or more generally one of a plurality of instances of interaction data) for a given virtual object in the virtual object group. This technique can be performed without requiring an analysis of the respective instances of interaction data and can ensure that incompatible interactions are not combined for a respective virtual object. In this way, a respective instance of the interaction data can be permitted for use by another virtual object. In some examples, the control circuitry 340 randomly selects one of the two or more of the virtual objects having associated interaction data to share the interaction data for the selected virtual object for use by another virtual object.

In some embodiments of the disclosure, the control circuitry 340 is configured to detect an interaction type associated with the first interaction data and the second interaction data and share both the first interaction data and the second interaction data with a third virtual object assigned to the same virtual object group to thereby provide a user interaction for the third virtual object, when the first interaction data and the second interaction data have a different interaction type. As explained previously, the interaction data associated with a virtual object may enable different types of interaction for that object, including audio interaction, visual interaction and/or haptic interaction. An interaction type for the interaction data associated with a virtual object is detectable by the control circuitry 340. For example, the interaction data associated with a given virtual object may take the form of one or more code scripts and an interaction type can be detected based on one or more syntax elements associated with the script. Alternatively or in addition, metadata may be associated with a virtual object for indicating one or more interaction types associated with the interaction data for the virtual object. In response to detecting the presence of two different types of interaction data, the control circuitry 340 can share both types of interaction data to permit use of both types of interaction data by a virtual object assigned to that virtual object group.

For example, first interaction data associated with a first virtual object may comprise audio data for providing an audio interaction and second interaction data associated with a second virtual object may comprise haptic data for providing a haptic interaction. The control circuitry 340 can thus detect the presence of the audio interaction type and the haptic interaction type for the two respective instances of interaction data and share the two respective instances of interaction data with any of the virtual objects, including with each other, potentially.

Table I below shows an example in which virtual objects A, B and C have been assigned to a same virtual object group and virtual objects A and B have been associated with respective interaction data having different interaction types (in this example, audio and haptic type interactions are used for explanation). Object A has associated interaction data corresponding to an audio type of interaction, object B has associated interaction data corresponding to a haptic type of interaction and object C has no associated interaction data (Y indicates presence and N indicates absence in the table). The control circuitry 330 can be configured to detect an interaction type for the interaction data and in the example shown in Table 1 both the interaction data corresponding to the audio type of interaction and the interaction data corresponding to the haptic type of interaction can be shared with the object C.

Table II below shows another example, in which virtual objects A, B and C have been assigned to a same virtual object group and virtual object A and B have been associated with interaction data having different interaction types. In this case, object B has both haptic type interaction data and audio type interaction data associated therewith. In this case, the haptic type interaction data associated with object B can be shared with object C and a random selection of one of the instances of audio type interaction data from object A and object B can be made for selecting the instance of audio type interaction data to be shared with object C. Alternatively, a single virtual object which provides the greatest number of interaction types may be preferentially selected so that only the interaction data associated with that single virtual object is shared so as to be permitted for use by another virtual object. In this way, a virtual object having a most complete set of interactions specified by the interaction data may be selected by the control circuitry 340 for sharing with the other virtual objects assigned to that virtual object group (therefore in this example, the interaction data for object B provides the most complete set of interaction and the interaction data for object B can be selected for sharing and the interaction data for object A is not selected for sharing). Hence more generally, in some embodiments of the disclosure the control circuitry 340 is configured to detect a number of respective interaction types associated with the first interaction data and the second interaction data, respectively, and to share the interaction data having the greatest number of respective interaction types with the third virtual object. In the example, shown in Table II, the interaction data associated with virtual object B represents the interaction data having the greatest number of respective interaction types.

TABLE 1

| Interaction data | A | B | C |
|---|---|---|---|
| Audio Type | Y | N | N |
| Haptic Type | N | Y | N |

TABLE II

| Interaction data | A | B | C |
|---|---|---|---|
| Audio Type | Y | Y | N |
| Haptic Type | N | Y | N |

The above discussion refers to sharing interaction data within a virtual object group to permit use of the shared interaction data for a third virtual object for which no interaction data has been provided. In some cases it may or may not be beneficial to permit use of interaction data associated with one virtual object for another object for which interactions have already been enabled.

In some cases, a developer may have associated first interaction data with the first virtual object and also associated interaction data with another virtual object assigned to a same group as the first virtual object. In this case, sharing of the first interaction data with the another virtual object may not be beneficial as a developer has already enabled interactions for the another virtual object. In some embodiments of the disclosure, the assignment circuitry 330 is configured to assign plurality of virtual objects to a same virtual object group and to share the first interaction data associated with the first virtual object with another virtual object (in other words, a second virtual object) assigned to the virtual object group in dependence upon whether interaction data is associated with the another virtual object. Therefore, the interaction data for the first virtual object can be selectively shared with other virtual objects in the group so as to share the interaction data with virtual objects for which there is no interaction data and sharing with virtual objects that have already been associated with interaction data during development can be selectively prohibited. In some embodiments of the disclosure, the control circuitry 340 is configured to prohibit sharing of the first interaction data with the second virtual object when the second interaction data is associated with the second virtual object. This may be particularly useful when a developer has associated first interaction data with a first virtual object for providing a haptic interaction (or other type of interaction) and has also associated second interaction data with a second virtual object for providing a haptic interaction, in that the second interaction data can be shared with other virtual objects assigned to the group and can be prohibited from being shared with another virtual objects for which haptic interactions have already been enabled. In this way, the haptic interactions provided by a developer for the first virtual object can be preserved for use by the first virtual object to allow haptic interactions with the first virtual object as initially intended by a developer. Hence in some embodiments of the disclosure, the control circuitry 340 is configured to prohibit sharing of the first interaction data with the second virtual object when the second interaction data is associated with the second virtual object (and vice versa).

However, as explained previously in some cases the first interaction data associated with the first virtual object and the second interaction data associated with the second virtual object may correspond to different interaction types. For example, a developer may have provided interaction data specifying an audio interaction for a given virtual object, and also provided interaction data specifying a haptic interaction for another virtual object assigned to the same virtual object group. In some embodiments of the disclosure, the control circuitry 340 is configured to detect an interaction type associated with the first interaction data and the second interaction data and to share the first interaction data with the second virtual object when the first interaction data and the second interaction data have a different interaction type. In this way, a virtual object that would otherwise have provided only an audio interaction can be made to provide both an audio interaction and a haptic interaction (or another similar combination of interactions) using the data shared within the virtual object group.

For example, a developer may have created a first virtual sword for use in a first scene to provide an audio interaction with a user and then created another virtual sword (having either a same visual appearance or a different visual appearance) for use in another scene to provide a haptic interaction (e.g. providing a swooshing sound for movements of a virtual sword when manipulated by an avatar and providing a haptic interaction to simulate gripping a handle and/or striking an object). By sharing interaction data within the virtual object group, both the audio interaction and the haptic interaction can be shared for use by virtual objects in that group thereby potentially increasing a number of interactive objects in a virtual environment and providing additional interaction types for an already interactive virtual object. Whilst the above example refers to haptic data and audio data, any combination of haptic data, audio data and animation data may be suitably used. Referring to the example in Table 1, the audio interaction data for object A can potentially be shared with object B so that both an audio interaction and a haptic interaction are possible for the object B. Similarly, the haptic interaction data for object B can potentially be shared with object A so that both an audio interaction and a haptic interaction are possible for the object A, in which the audio interaction is actually based on the interaction data shared by the object A. These represent examples of first and second interaction data that can be used in combination. In particular, by combining the first interaction data for one virtual object and the second interaction data for another object, a range of interaction mechanisms available for an already interactive object can be enhanced.

The interaction data represents data that has been created for, and associated with, a virtual object during a development stage for use by a data processor, such as a game engine (e.g. the Unreal 4™ game engine), for applying one or more interactions for that virtual object. In particular, the interaction data may specify one or more of an audio event, haptic event and animation event, and one or more conditions (e.g. user inputs and/or position and/or orientation of the virtual object) for which such an event is to be triggered.

The interaction data associated with a given virtual object may for example take the form of one or more code scripts (also referred to as interaction scripts) associated with the virtual object for specifying one or more events. A script can be created by a developer using editors such as the Unity editor and optionally an authoring tool such as Audiokinetic Wwise. For example, the interaction data for a haptic feedback event for a virtual object may take the form of a script comprising code for specifying: a condition for which the haptic event is to be triggered, a target device for the haptic event (e.g. a handheld controller), one or more haptic effects, and an intensity for the one or more haptic effects. Interaction data for an audio event or animation event may take a similar form. In some examples, the interaction data may comprise a script for a virtual object for enabling a virtual object to be animated in response to an interaction with a user's avatar so that the virtual object can be grasped by a hand of the avatar (e.g. the script may specify attachment for the virtual object to a node of an avatar for a given condition). As such, sharing of such interaction data within a given virtual object group may increase the number of virtual objects that can be grasped by a user's avatar. Various techniques exist for allowing developers to create scripts which can be associated with virtual objects for controlling their in-game interactions.

Machine learning techniques are used to classify virtual objects included in the graphics data for the virtual environment. The convolutional neural network (CNN) is a class of deep learning neural networks particularly suited for the task of such classification.

In some embodiments of the disclosure, the machine learning model 320 is trained to output the data indicative of the object classification for a given virtual object in dependence upon a type of the given virtual object. The machine learning model 320 can be trained with labelled training data (e.g. labelled mesh data, labelled point cloud data, labelled texture data and/or labelled images), where the label provides an indication of a type of object that is present in the data. The machine learning model can thus learn features that are representative of a given type of object (via so-called 'supervised learning'). The machine learning model 320 can thus be trained to classify the objects according to their type. Therefore, in response to receiving an image of the virtual environment, the machine learning model 320 can output data indicative of a class of object for which the machine learning has been trained so that objects are classified according to their type. For example, the output may comprise an integer which is mapped to a respective class label for which the model has been trained. For example, labelled training data comprising labelled meshes and/or images of any object types such as cars, guns, chairs, hand tools and drinking vessels may be used to train the machine learning model to classify these types of objects.

It will be appreciated that the machine learning model 320 can be trained to provide a relatively broad or narrow classification as required. For example, for an action-adventure game, a single object classification for car objects may be sufficient, whereas for a driving game a number of narrower classifications for different types of car, such as saloon type and convertible type, may be used. Similarly, a single classification for an object type corresponding to a ball may be used or narrower classifications such as golf ball, baseball and so on may be used.

However, having a same interaction mechanism for each virtual object of a same object type is not always appropriate and so a narrower classification may be more appropriate in some circumstances. In some embodiments of the disclosure, the machine learning model 320 is trained to output the data indicative of the object classification for a given virtual object in dependence upon a type and a size of the given virtual object. The machine learning model 320 can be trained with labelled training data, where the label provides an indication of both a type of object and a relative size for that object that is present in the training data. The machine learning model can thus learn features (e.g. mesh features and/or image features) that are representative of a given type of object having a relative size and thereby classify objects according to their type and relative size. This may be beneficial in that rather than classifying objects of a same type into a single (and thus broad) classification, two or more classifications can be provided for a same object type, and therefore a virtual object group can be established for each of the two or more classifications. In particular, allowing interaction data associated with a virtual object to be used for another virtual object of the same type so that both objects are able to provide a same user interaction is acceptable for many object types. However, for some cases a user interaction with an object of a given type should differ depending on a size of the object. An example of this could be a type of virtual weapon for example, such a sword, in that a developer will typically create interactions for a large sword that are different to interactions for a smaller dagger due to the different properties (e.g. a different swooshing sound as the weapon moves through the air and/or a different clanging sound when contacting an object due to the different length of the blade). This represents one example of a case in which classification based on both object type and object size can be used so that the virtual objects assigned to a same virtual object group each have a same object classification based on object type and size.

In some embodiments of the disclosure, the graphics data comprises one or more images of the virtual environment, and the machine learning model 320 is trained to output data indicative of a scene classification for one or more of the images of the virtual environment, and wherein the assignment circuitry 330 is configured to assign one or more of the virtual objects to one or more of the virtual object groups in dependence upon the scene classification and the object classification, wherein the virtual objects assigned to a same virtual object group each have a same scene classification and object classification. In some video games, a virtual object may be created for a scene to have one or more user interactions and a virtual object of a same type may be created for a different type of scene to have one or more different user interactions. The machine learning model 320 can be trained using labelled training images, where the label provides an indication of a type of object that is present and also a type of scene. By classifying virtual objects according to both scene type and object type so that the plurality of virtual objects assigned to a same virtual object group each have the same scene type and same object classification, virtual objects can be grouped to allow more contextually relevant sharing of interaction data.

Figure 4:
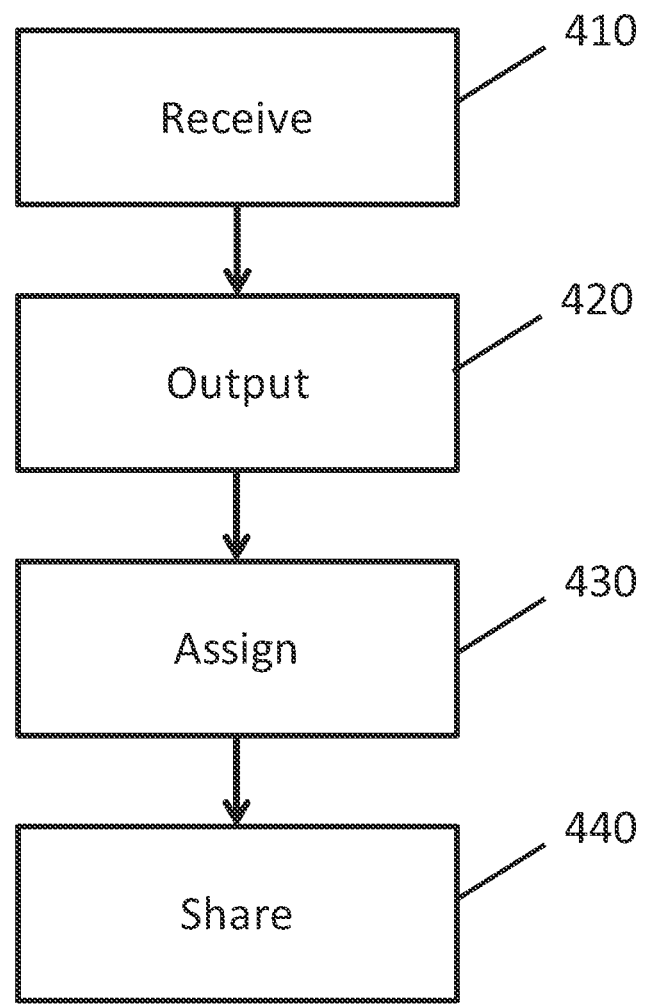
FIG. 4 is a schematic flowchart of a data processing method.

FIG. 4 is a schematic flowchart illustrating a data processing method. The method comprising:

receiving (at a step 410) graphics data for at least a portion of a virtual environment, the graphics data including a plurality of virtual objects;

outputting (at a step 420), by a machine learning model, data indicative of an object classification for one or more of the virtual objects in dependence upon the graphics data;

assigning (at a step 430) one or more of the virtual objects to one or more virtual object groups in dependence upon the object classification for one or more of the virtual objects, wherein the virtual objects assigned to a same virtual object group each have a same object classification; and sharing (at a step 440) first interaction data associated with a first virtual object assigned to a virtual object group with a second virtual object assigned to the virtual object group to thereby permit use of the first interaction data for the second virtual object in response to a user interaction with the second virtual object in the virtual environment.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. A data processing apparatus, comprising:
receiving circuitry to receive graphics data for at least a portion of a virtual environment, the graphics data including a plurality of virtual objects;
a machine learning model trained to output data indicative of an object classification for one or more of the virtual objects in dependence upon the graphics data;
assignment circuitry to assign one or more of the virtual objects to one or more virtual object groups in dependence upon the object classification for one or more of the virtual objects, wherein the virtual objects assigned to a same virtual object group have a same object classification; and
control circuitry to share first interaction data associated with a first virtual object assigned to a virtual object group with a second virtual object assigned to the virtual object group to thereby permit use of the first interaction data for the second virtual object in response to a user interaction with the second virtual object in the virtual environment, wherein the first interaction data is associated specifically with the first virtual object, wherein second interaction data is associated with the second virtual object, and wherein:
the control circuitry is configured to share one of the first interaction data and the second interaction data with a third virtual object assigned to the virtual object group to permit use of one of the first interaction data and the second interaction data for the third virtual object in response to a user interaction with the third virtual object in the virtual environment; and
the control circuitry is configured to detect a number of respective interaction types associated with the first interaction data and the second interaction data, respectively, and to share interaction data having the greatest number of respective interaction types with the third virtual object.

2. The data processing apparatus according to claim 1, wherein the control circuitry is configured to share the first interaction data associated with the first virtual object with each virtual object assigned to the virtual object group.

3. The data processing apparatus according to claim 1, wherein the control circuitry is configured to detect an interaction type associated with the first interaction data and the second interaction data and share both the first interaction data and the second interaction data with a third virtual object assigned to the virtual object group to permit use of both the first interaction data and the second interaction data for the third virtual object in response to a user interaction with the third virtual object in the virtual environment, when the first interaction data and the second interaction data have a different interaction type.

4. The data processing apparatus according to claim 1, wherein the control circuitry is configured to share the first interaction data with the second virtual object in dependence upon whether second interaction data is associated with the second virtual object.

5. The data processing apparatus according to claim 4, wherein the control circuitry is configured to prohibit sharing of the first interaction data with the second virtual object when the second interaction data is associated with the second virtual object.

6. The data processing apparatus according to claim 4, wherein the control circuitry is configured to detect an interaction type associated with the first interaction data and the second interaction data and to share the first interaction data with the second virtual object when the first interaction data and the second interaction data have a different interaction type.

7. The data processing apparatus according to claim 1, wherein the assignment circuitry is configured to assign a plurality of virtual objects to a first virtual object group and to assign a plurality of virtual object to a second virtual object group, wherein the first virtual object group and the second virtual object group have a different object classification.

8. The data processing apparatus according to claim 1, wherein the first interaction data has been created in advance for the first virtual object.

9. The data processing apparatus according to claim 1, wherein the first interaction data associated with the first virtual object comprises one or more of:
haptic data;
audio data; and
animation data.

10. The data processing apparatus according to claim 1, wherein the machine learning model is trained to output the data indicative of the object classification for a given virtual object in dependence upon a type of the given virtual object.

11. The data processing apparatus according to claim 10, wherein the machine learning model is trained to output the data indicative of the object classification for the given virtual object in dependence upon a size of the given virtual object.

12. The data processing apparatus according to claim 1, wherein the graphics data comprises one or more images of the virtual environment, wherein the machine learning model is trained to output data indicative of a scene classification for one or more of the images of the virtual environment, and wherein the assignment circuitry is configured to assign one or more of the virtual objects to one or more of the virtual object groups in dependence upon the scene classification and the object classification, wherein the virtual objects assigned to a same virtual object group each have the same object classification and a same scene classification.

13. A data processing method comprising:
receiving graphics data for at least a portion of a virtual environment, the graphics data including a plurality of virtual objects;
outputting, by a machine learning model, data indicative of an object classification for one or more of the virtual objects in dependence upon the graphics data;
assigning one or more of the virtual objects to one or more virtual object groups in dependence upon the object classification for one or more of the virtual objects, wherein the virtual objects assigned to a same virtual object group each have a same object classification; and sharing first interaction data associated with a first virtual object assigned to a virtual object group with a second virtual object assigned to the virtual object group to thereby permit use of the first interaction data for the second virtual object in response to a user interaction with the second virtual object in the virtual environment, wherein the first interaction data is associated specifically with the first virtual object, wherein second interaction data is associated with the second virtual object;

sharing one of the first interaction data and the second interaction data with a third virtual object assigned to the virtual object group to permit use of one of the first interaction data and the second interaction data for the third virtual object in response to a user interaction with the third virtual object in the virtual environment; and detecting a number of respective interaction types associated with the first interaction data and the second interaction data, respectively, and sharing interaction data having the greatest number of respective interaction types with the third virtual object.

14. A non-transitory, computer readable storage medium containing computer software which, when executed by a computer, causes the computer to carry out a method comprising:

receiving graphics data for at least a portion of a virtual environment, the graphics data including a plurality of virtual objects;

outputting, by a machine learning model, data indicative of an object classification for one or more of the virtual objects in dependence upon the graphics data;

assigning one or more of the virtual objects to one or more virtual object groups in dependence upon the object classification for one or more of the virtual objects, wherein the virtual objects assigned to a same virtual object group each have a same object classification; and sharing first interaction data associated with a first virtual object assigned to a virtual object group with a second virtual object assigned to the virtual object group to thereby permit use of the first interaction data for the second virtual object in response to a user interaction with the second virtual object in the virtual environment, wherein the first interaction data is associated specifically with the first virtual object, wherein second interaction data is associated with the second virtual object;

sharing one of the first interaction data and the second interaction data with a third virtual object assigned to the virtual object group to permit use of one of the first interaction data and the second interaction data for the third virtual object in response to a user interaction with the third virtual object in the virtual environment; and detecting a number of respective interaction types associated with the first interaction data and the second interaction data, respectively, and sharing interaction data having the greatest number of respective interaction types with the third virtual object.

15. The data processing method according to claim 13, wherein the first interaction data associated with the first virtual object is shared with each virtual object assigned to the virtual object group.

16. The data processing method according to claim 13, wherein the first interaction data associated with the first virtual object comprises one or more of:
haptic data;
audio data; and
animation data.

17. The non-transitory, computer readable storage medium according to claim 14, wherein the first interaction data associated with the first virtual object is shared with each virtual object assigned to the virtual object group.

* * * * *